(12) United States Patent
Lietaer

(10) Patent No.: US 7,124,969 B2
(45) Date of Patent: Oct. 24, 2006

(54) CUTTING DEVICE FOR REDUCING WASTE MATERIAL

(75) Inventor: Frederic Lietaer, Otegem (BE)

(73) Assignee: Feltron NV, Otegem (BE)

( * ) Notice: Subject to any disclaimer, the term of this patent is extended or adjusted under 35 U.S.C. 154(b) by 0 days.

(21) Appl. No.: 10/506,190

(22) PCT Filed: Feb. 28, 2003

(86) PCT No.: PCT/EP03/02149

§ 371 (c)(1),
(2), (4) Date: Sep. 29, 2004

(87) PCT Pub. No.: WO03/074182

PCT Pub. Date: Sep. 12, 2003

(65) Prior Publication Data

US 2005/0121548 A1    Jun. 9, 2005

(30) Foreign Application Priority Data

Mar. 1, 2002  (BE) ................................ 2002/0142

(51) Int. Cl.
*B02C 18/16* (2006.01)
(52) U.S. Cl. ..................................... 241/89.3; 241/242
(58) Field of Classification Search ................ 241/242, 241/243, 294, 295, 73, 89.3, 88.1
See application file for complete search history.

(56) References Cited

U.S. PATENT DOCUMENTS 3,658,265 A    4/1972    Johnson
5,320,293 A *  6/1994    Laly et al. ................... 241/242
5,544,826 A *  8/1996    Klingler et al. ............. 241/242
5,779,167 A *  7/1998    Wagstaff ..................... 241/242

FOREIGN PATENT DOCUMENTS

| DE | 3827767 | 8/1989 |
| EP | 0785026 | 7/1997 |
| FR | 2785205 | 5/2000 |
| WO | WO 01/64018 | 9/2001 |

* cited by examiner

*Primary Examiner*—Mark Rosenbaum
(74) *Attorney, Agent, or Firm*—James Creighton Wray

(57) ABSTRACT

A cutting device for reducing waste material comprises at least two groups of knives mounted on a shaft, next to one another, installed rotatably in front of an anvil. The groups of knives, each operating in a restricted zone of the width of supply each comprises several splitting knives to split the waste material mainly according to the sense of supply of the waste material. Each comprises at least one chopping knife intended to cut the waste material mainly across the sense of supply of the waste material to be cut. The chopping knives of the groups of knives situated next to one another are mounted on the shaft, shifted with respect to one another, so that each of them affects the waste material at a different time and place. A calibrating sieve filters the free discharge of the shreds and contributes to a supplementary (secondary and tertiary) cutting.

8 Claims, 6 Drawing Sheets

Fig. 5

CUTTING DEVICE FOR REDUCING WASTE MATERIAL

This application claims the benefit of Belgian Application No. 2002/0142 filed Mar. 1, 2002 and PCT/EP03/02149 filed Feb. 28, 2003.

BACKGROUND OF THE INVENTION

This invention relates to a cutting device for reducing waste material, comprising at least two groups of knives mounted on a shaft, next to one another, installed rotatably in front of an anvil, the said groups of knives comprising each several splitting knives, intended to split the waste material mainly according to the sense of supply and comprising at least one chopping knife, intended to cut the waste material mainly across the sense of supply of the waste material to be cut.

The invention relates, for instance, to a cutting device to uniformly reduce waste material, more particularly a cutting device for shredding all sorts of organic material (garden waste, loppings, branches, leaves, agricultural crops, foliage, . . . ).

The invention more particularly relates to a cutting device, in which a number of groups of knives, composed of fixed splitting knives and chopping knives, are mounted on a shaft next to one another and are rotating in a housing where they cut the waste material by interacting with an anvil and a calibrating sieve.

The organic waste material, more particularly wood, (this being the hardest form of green waste material), is composed of fibres running lengthwise within their structure. If it is required to cut across a bundle of fibres, more particularly a branch, all the fibres should be cut across, an operation which requires quite some energy, and the thicker the wood, the more fibres have to be cut across.

Now, various systems are known, hitting across the loppings by means of a chopping knife or a drawknife on a counterknife, in order to shred the waste material.

A first known system is the disc chipper, where a number of knives are mounted in the plane of the large disc against which the wood is pushed and chopped off between the knives and a counterknife.

A second known system is the shave chipper, in which a number of knives are mounted lengthwise along the wall of a drum. The wood is pushed against the wall of the drum, causing the wood to be chopped crosswise between the knives and a counterknife.

Irrespective of their construction, both systems have a number of serious drawbacks:

both systems require rather much energy;
ligneous material is transformed into compressed shreds, difficult to compost;
green material or material rich in leaves is hardly or not at all reduced;
the cutting parts are sensitive to wear;

Another, very frequently found system is chopping wood in the sense of the fibre by means of flails or hammers. This is a system in which the rotor is composed of a number of discs on which, or between which, loose cutting elements have been suspended. These freely suspended flails or hammers will smash the green waste material to pieces.

Similar systems likewise require a lot of power, because they crush the material mainly by the striking power of the cutting elements. Additionally, these systems produce shreds of a very irregular shape and size as garden waste may pass between the striking hammers, because they are not mounted against one another.

Also in EP 0 785 026 a cutting device is described for reducing waste material. More particularly, this is a cutting device comprising an anvil and groups of knives mounted on a shaft having fixed knives. Within a group of knives, the extremities of the knives have been installed in a manner shifted with respect to one another, so that the projections of the cutting faces on the anvil overlap each other or run into one another.

Although it is possible to shred the waste material over the total width of supply by means of such a device, and the position of the knives allows for a better cutting efficiency, the cutting device described in EP 0 785 026 it is not always able to cut the waste material in an optimal manner (especially in case of a tough and fibrous green waste material).

WO-01/64018 is essentially based on EP 0 785 026 and tries to find a solution to the above-mentioned drawback by adding cross knives to the cutting device described in EP 0 785 026. However, each cross knife is chopping over the entire width of supply all in one go, because of which this construction brings along a few serious drawbacks:

a higher power consumption, because the material supplied to each cross knife causes the rotor to slow down at the same moment;
a higher and pulsating noise level;
a higher sensitivity to damage (in case a strange object is introduced) because there is less chance to avoid the cross knife which has the same width as the machine;
heavy vibrations on the wood (kick-back effect);
the material (for instance, branches) is pulled in aggressively, causing danger to the operators.

An additional drawback of the system mentioned above, but also of the disc and shave shredder, is that the size of the shreds is mainly determined by the cutting frequency of the cross knife and the rate and speed of supply. As these two factors are determined by the construction of the machine, it is difficult to determine an invariable size of chips or shreds at changing material to be shredded (different kinds of green waste material). At the same time, the wood is projected into the discharge channel as soon as it is chopped off, so that it leaves the shredding system immediately and no additional shredding will occur in the shredding chamber.

The purpose of this invention is to propose a cutting device not showing the drawbacks mentioned above, which will shred any material uniformly and finely at the lowest possible energy consumption.

SUMMARY OF THE INVENTION

According to the invention, this purpose is attained by providing a cutting device comprising at least two groups of knives situated next to one another and mounted on a shaft and rotatably installed in front of an anvil, each said group of knives comprising several fixed splitting knives, intended to split the waste material essentially according to the sense of supply, and comprising at least one chopping knife intended to cut the waste material essentially across the sense of supply, the chopping knives of the groups of knives situated next to one another each affecting a zone of the width of supply and being mounted on the shaft, turned with respect to one another, so that each of them will operate on the waste material at a different time.

The expression "turned" means that the chopping knives of groups of knives situated next to one another are always situated X° further away on the circumference (turned X° radially with respect to one another), because of which the chopping knives of the groups of knives situated next to one another never simultaneously affect the material supplied, at the same time, the chopping knives of the groups of knives situated next to one another also operate only on a part of the width of supply.

The great advantage of this property is, that the chopping knives always affect the waste material in different places and at different times, because of which the chopping off impact is spread. Consequently the material is shredded in an effective manner and at a strongly reduced energy consumption. At the same time this device produces far less noise and vibrations than known systems.

Moreover, the property mentioned above has the important advantage that the negative kick-back effect, when working with chopping knives installed crosswise, is neutralized. Because of this, the operational comfort of the operator supplying the machine with material, is considerably increased.

In a preferred embodiment of the cutting device according to the present invention, the cutting device comprises a shredding chamber of which the discharge side is provided with a sieve equipped with openings to calibrate the shreds. In the continuation of this patent application, this sieve is referred to as the calibrating sieve.

Because of the presence of the calibrating sieve, after having been cut, the shreds are further reduced inside the shredding chamber essentially by the action of the splitting knives (=secondary cutting), until finally they will reach the right size enabling them to pass through the passing openings of the sieve. Exactly during this passage, an additional cutting occurs (=tertiary cutting), during which the shreds are chopped off between the chopping knives and the edge of the opening. In this way any material can be supplied and the uniform size of the shreds required can always be obtained irrespective of chopping frequency or rate of supply.

Cutting the material supplied at the anvil (primary cutting) mainly occurs by means of the splitting knives. The only purpose of the chopping knife in each group of knives is to cut across the fibre bundles regularly, in order to prevent that long and fibrous shreds are formed.

In a more preferred embodiment of the cutting device according to the present invention, the splitting knives of one group of knives are mounted on the shaft in a position shifted with respect to one another, so that the projection of their cutting faces on the anvil do not coincide. Because of this, each splitting knife of a group of knives affects a zone of the material, which is not treated by another knife.

The expression "shifted" means that the position of the top of the knife has been shifted and/or turned away with respect to the central plane of the knife holder.

In a most preferred embodiment of the cutting device according to the present invention, the projections of the cutting face of each chopping knife determine a cutting zone over which the projections of the cutting faces of the splitting knives are evenly spread.

The total cutting area of a group of knives always acts on a part of the width of supply. By installing two or more groups of knives next to one another, a larger part of the width of supply may be covered.

In the preferred embodiment of the cutting device according to the invention, a number of groups of knives are installed next to one another in such a manner that the projections of their cutting faces on the anvil do at least run into each other or partly overlap each other and thus will cover the total width of supply of the cutting device.

In order to further clarify the properties of the present invention and to indicate its additional advantages and particulars, a more detailed description of a cutting device, carried out in accordance with the present invention, will follow. It should be clear that nothing of the following description may be interpreted as a restriction of the protection of the present invention, claimed for in the claims.

In this description reference is made to the attached drawings by means of reference numbers, where:

BRIEF DESCRIPTION OF THE DRAWINGS

FIG. 5 shows the diagram of the passage and the impact of the knives with respect to the anvil;

DETAILED DESCRIPTION OF THE PREFERRED EMBODIMENTS

Figure 1:
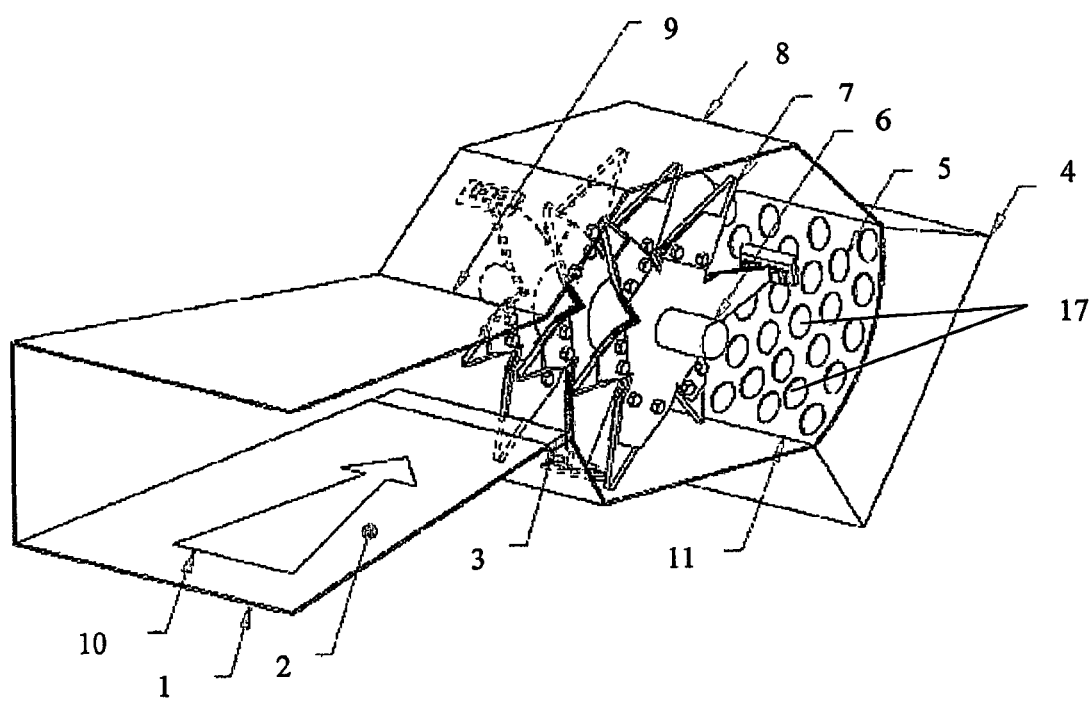
FIG. 1 is a perspective representation of a similar cutting device.
Figure 2:
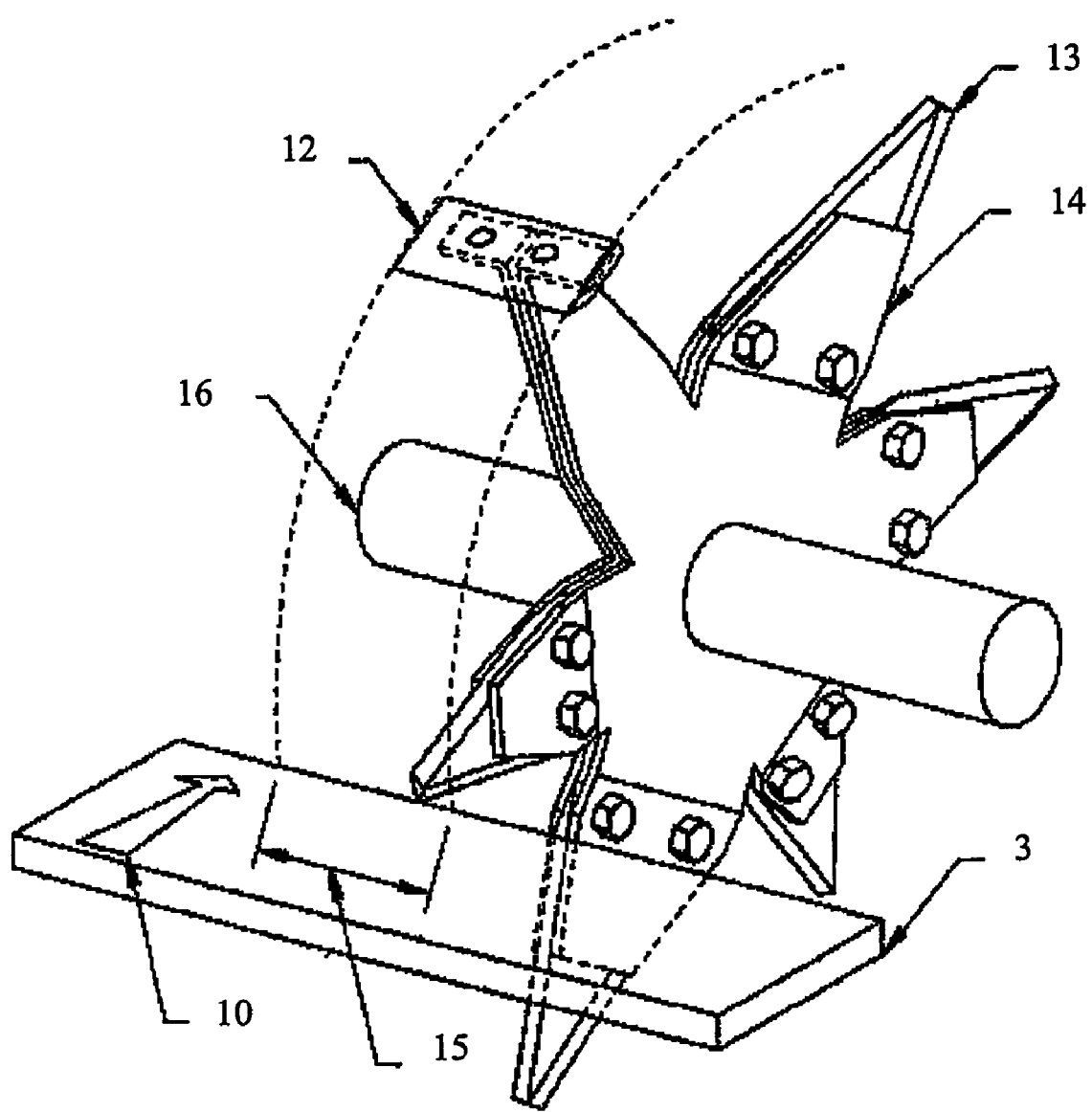
FIG. 2 is a perspective representation of one group of knives.
Figure 3:
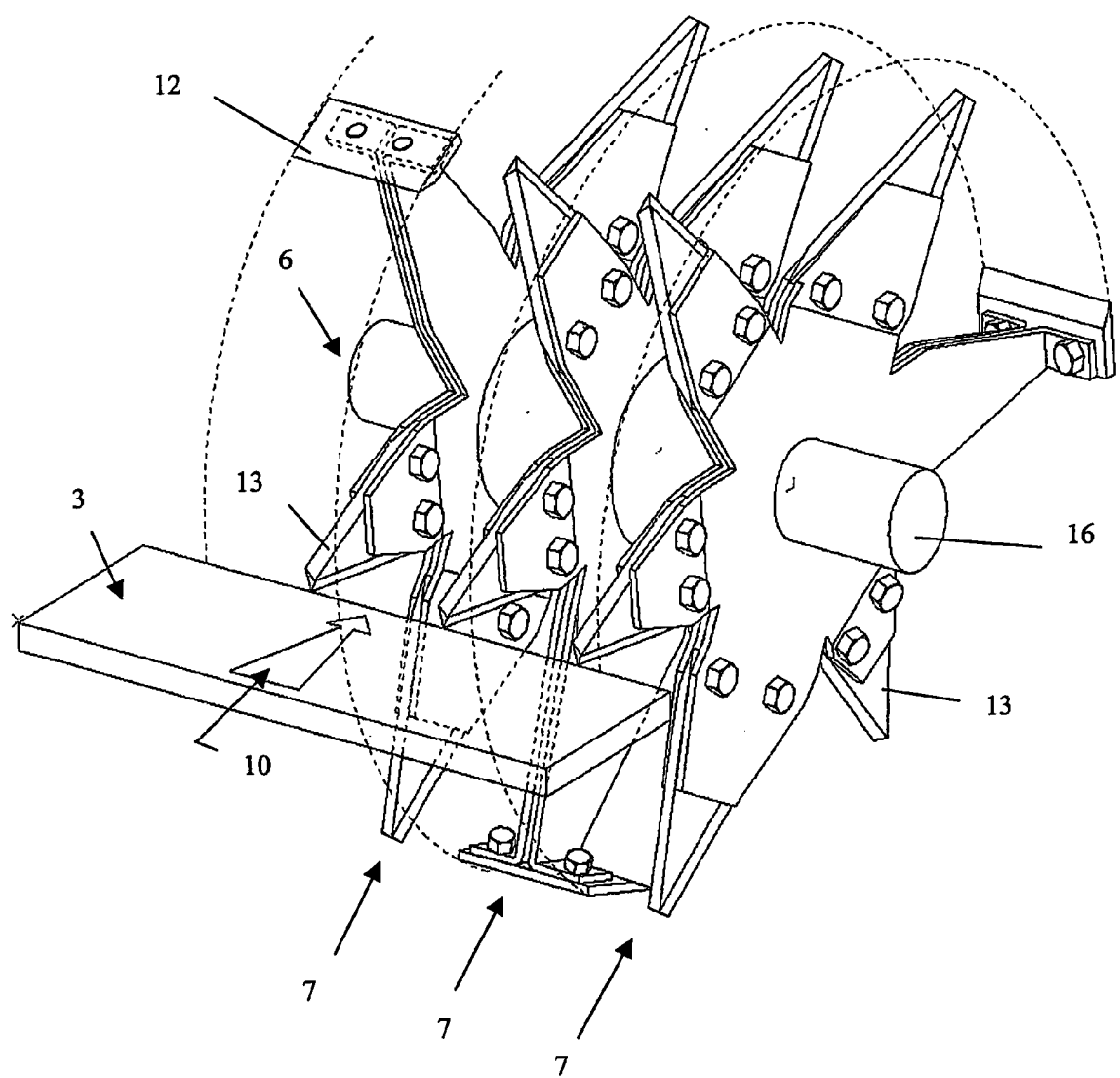
FIG. 3 is a perspective representation of a cutting device composed of three groups of knives, in which the characteristics are clearly visible.

According to the invention, the cutting device comprises a rotor (6), installed at right angles to the sense of supply (10), composed of a shaft (16), at the circumference of which a number of knives have been mounted fixedly. The rotor (6) rotates in a housing, called the shredding chamber (8). The shredding chamber (8) has two openings, one of which is the supply opening (9) the other is the discharge opening (11). The supply opening (9) (width of supply× height of supply) is the opening by which the supply hopper (1) discharges into the shredding chamber (8). The width of supply being equal to the field of action of the knives. In other words the width of supply is determined by the number of groups of knives (7).

The discharge opening (11) is partly closed off by a sieve (5) with passage openings (17), which, hereafter in the text of the description, will be referred to as a calibrating sieve (5). This sieve (5) is a perforated screen (17), having openings which determine the size of the shreds.

The bottom plate (12) of the supply hopper (1) discharges into the shredding chamber (8) with the anvil (3). The anvil (3) is the last contact plane of the mass of green waste material, before the knives will cut it into pieces. The course of the knives runs right in front of the anvil (3), because of which it will function as a buffer block for the chopping and splitting operation.

A group of knives (7) of the cutting device comprises two kinds of knives, namely splitting knives (13) and chopping knives (12). The splitting knives (13) carry out the operation of splitting the material, because of this, these knives are installed in a line, or at a slight angle (<90°) with respect to the sense of supply (10). The chopping knives (12) are the knives carrying out the chopping movement, and the cut of which is at right angles (90°) with the sense of supply (10).

As appears from practical experience, that by combining the two operations, namely splitting and chopping, it is possible to cut organic waste material, more particularly wood, in a much more efficient manner and with a minimum of energy consumption.

For instance, a branch (a large bundle of fibres) is split and ravelled out into thinner fibre bundles. These thinner strings of fibres require less energy to be cut than the original bundle of fibres.

Cutting through the strings of fibres is done by sharp chopping knives (12), skimming closely along the anvil (3) of the cutting device. It should be noted here that, at that moment, the anvil (3) acts as a counterknife. Installing the knives per group of knives will ensure a variation of a number of splitting movements with respect to a chopping movement and the more splitting movements, the more efficient the energy balance (power/efficiency) will be.

In order to optimize the energy absorption per splitting knife, it is important that each splitting knife is at a different angle with respect to the sense of supply (10). Thus, each knife takes care of another zone of the wood, which comes within the field of action (15) of the group of knives (7). Because of this, the fragmentation of the wood will be improved and moreover, the splitting knives take away a large part of the resistance, which occurs during the chopping movement.

The shreds, formed after splitting and chopping, have ideal composting properties. As the wood is first split lengthwise an elongated shred is produced, the fibres of which have been sufficiently crushed. The chemical reaction occurring during the first stage of the composting process, very soon will affect the compounds of the fibres, so that the wood is decomposed more rapidly. Because the wood split up (bundles of fibres) is also chopped during the shredding process, a very regular size of the shreds is obtained. Moreover, also materials having very tough and threadlike fibres will be cut efficiently.

It is also possible to shred into very fine pieces moist and leafy green waste material (very finely), because every cutting part is mounted fixedly in the group of knives (7). As it is not possible for the knives to snap back, each piece of green waste material entering the trajectory of a knife is bound to be cut. The calibrating sieve (5), placed in the discharge opening (11), will ensure that the material will stay in the shredding chamber (8), so that it is further cut up into small particles. The homogenous mixture of fine pieces of green leaves green and wooden material is fuel for a rapidly composting system.

The cutting device according to the invention is equipped with a rotor (6) provided with three groups of knives (7). Each group of knives (7) is provided with six knives. The composition of the knives, in the example considered, is 5 splitting knives (13) to 1 chopping knife (12).

A group of knives (7) consists of one knife holder (14) having six places. The knives are fixed in the knife holders (14) by means of bolts. These knife holders (14) are welded to the knife shaft (16). The knife shaft (16) is mounted parallel to the anvil (3), so that the cutting faces of the knives are installed in the sense of supply (10).

In order to obtain a regular chopping frequency, the knives of a group of knives (7) are equally distributed along the circumference of a knife holder (14). Each knife is bolted fixedly to the knife holder (14) in several points. Consequently it is not possible for the knife to spring back if it comes into touch with the material to be shredded.

Figure 5:
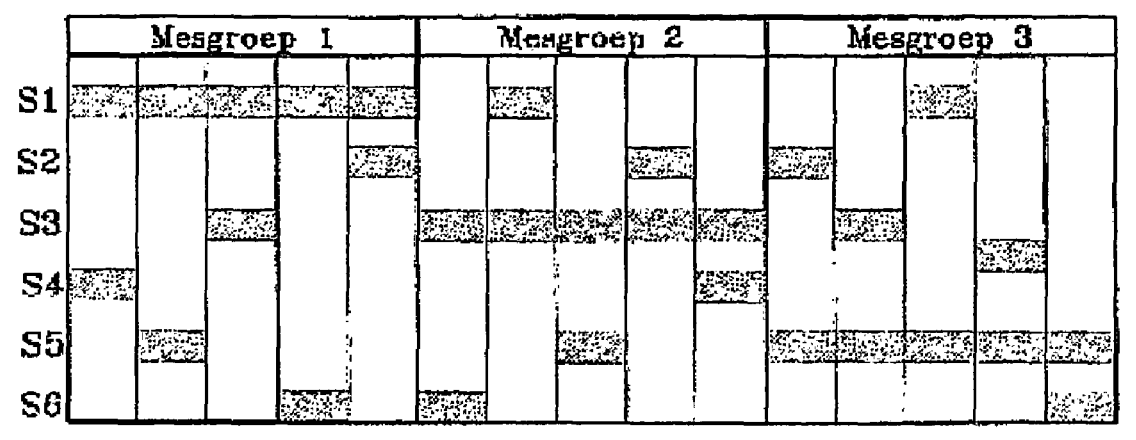

Level with the fastening points for the knives, the knife holder (14) is folded at different angles. Because of this, the splitting knives (13) (especially the tips of the knives) affect the material to be shredded in different points within the field of action (15) of the chopping knife (12). In FIG. 5 the diagram shows the passage of the tips of the knives with respect to the anvil. Therefore it can be seen clearly that for the group of knives 1 (a), S2 and S4 (shifted at a great angle) are shredding the material along the outside of the field of action (15). That S5 and S6 (shifted at a small angle) are shredding the material situated somewhat more inwardly. That S3 (straight knife) is shredding the material situated in the centre of the field of action (15) and that S1 (chopping knife 12) is active all over the field of action (15).

The chopping knives (12) treat a certain zone of the width of supply. In the constellation of the rotor (16) the groups of knives (7) are placed thus that the separate zones, treated by the chopping knives (12), run into one another or partly overlap one another. The width of supply coincides, of course, with the field of action of the rotor (6). (the total sum of the cutting zone of the three groups of knives).

The anvil (3) plays an important part in the cutting device. The cutting efficiency of the machine is closely connected to the interaction between the knives and the anvil. The anvil (3) has a double function, first of all it is a stop block for the splitting knives (13); the points of the knives are cleaving themselves through the material moving along the anvil (3), the anvil (3) is blocking off the wood and is absorbing the thrust. Secondly, the anvil (3) acts as a counterknife for the chopping knives (12). As the chopping knife (12) runs very closely to he anvil (3) the wood, torn open already, is cut off like a pair of scissors.

If we now consider each group of knives (7) to be an energy cell, we may state that the entire rotor is a composition of energy cells, which we call an energy grid. The chopping knives (12) in an energy cell are absorbing the greater part of the energy (=energy peak). It is the characteristic of this invention to keep the energy balance of the entire energy grid at an optimal level and to distribute the energy peaks well to that effect. Therefore, at the construction of the rotor (6), when positioning the energy cells, the energy peaks are prevented from coinciding.

Figure 4:
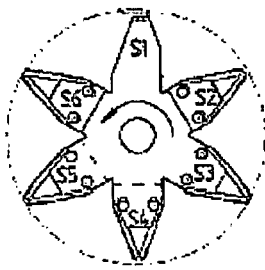
FIG. 4 shows the interaction of the knives on the anvil, which illustrates the energy saving operation of the system, where (a) represents the group of knives 1, (b) the group of knives 2, (c) the group of knives 3 and (d) the complete knife-shaft.
Figure 4:
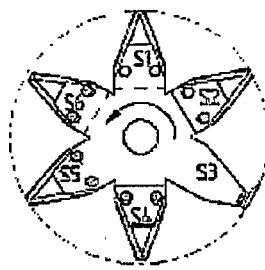
Figure 4:
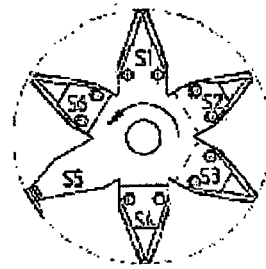

Now, in order to obtain the optimal energy balance on the rotor (6), the knife holders (14) will be attached to the shaft (16) in such a manner that, in the case of the example discussed, the position of the chopping knife (12) for each group of knives (7) is shifted over 120° with respect to one another. As in this case a construction with 3 groups of knives (7) is considered, only after each third part (120°) of a turn, a chopping knife (12) will act on the anvil (3). In FIG. 4, the course of energy can be followed in each sector when turning. From this we may deduce, that for the different groups 1, 2 and 3 (a, b, c) the greater part of the energy is absorbed by the chopping knife (S1/a, S3/b, S5/c) as it is hitting the fibre crosswise. The splitting knives S2/a, S4/b, S6/c and S4/a, S6/b, S2/c which have been "shifted" most (turned over a great angle) with respect to the central plane of the knife holder (14) likewise absorb rather a lot of energy, as they hit the fibre rather crosswise. The splitting knives S5/a, S1/b, S3/c and S6/a, S2/b, S4/c, having been "shifted" less (turned over a smaller angle), absorb still less energy, as they hit the fibre already largely in the sense of the fibre. The splitting knife S3/a, S5/b, S1/c, being entirely straight, absorbs the least energy, as it acts entirely in the sense of the fibre.

By turning the chopping knife (12) (S1/a, S3/b, S5/c) of groups of knives situated next to one another, radially with respect to one another (angle of rotation of 120°), a much better spreading of power is obtained, this appears from (d)

where the power absorption per sector of the entire knife shaft is represented. An equal charge of each section is obtained.

By spreading the energy peaks as to place and time, the rotor (6) will be charged far more evenly. Because of this, the peak power absorbed by the engine is flattened.

As the chopping knives (12) follow a circular trajectory they will have a tendency to pull along the wood along this trajectory when hitting the wood. As a reaction, the wood will be bent forward and pulled inside. This short hit and jerk will make it uncomfortable for the operator to handle the wood when introducing it. This negative property is generally observed in shredding systems using chopping knives hitting the wood crosswise. The invention described neutralizes this so-called kick-back effect to a large extent. This is first of all explained by the fact that each chopping knife (12) acts only in a restricted zone (15) of the width of supply. In many cases this causes the material to be only partly affected by this chopping knife (12) because of which the impact on the wood is restricted. According to the conditions of the invention, at the moment the chopping knife (12) of a group of knives (7) is affecting the material at the anvil, in the adjacent groups of knives (7), splitting knives are always active on the anvil (3). Because of the fact that the splitting knives (13) cleave themselves through the wood, the wood is clamped by the knives during that operation. Therefore the kick-back effect of the chopping knife is dampened.

Figure 6:
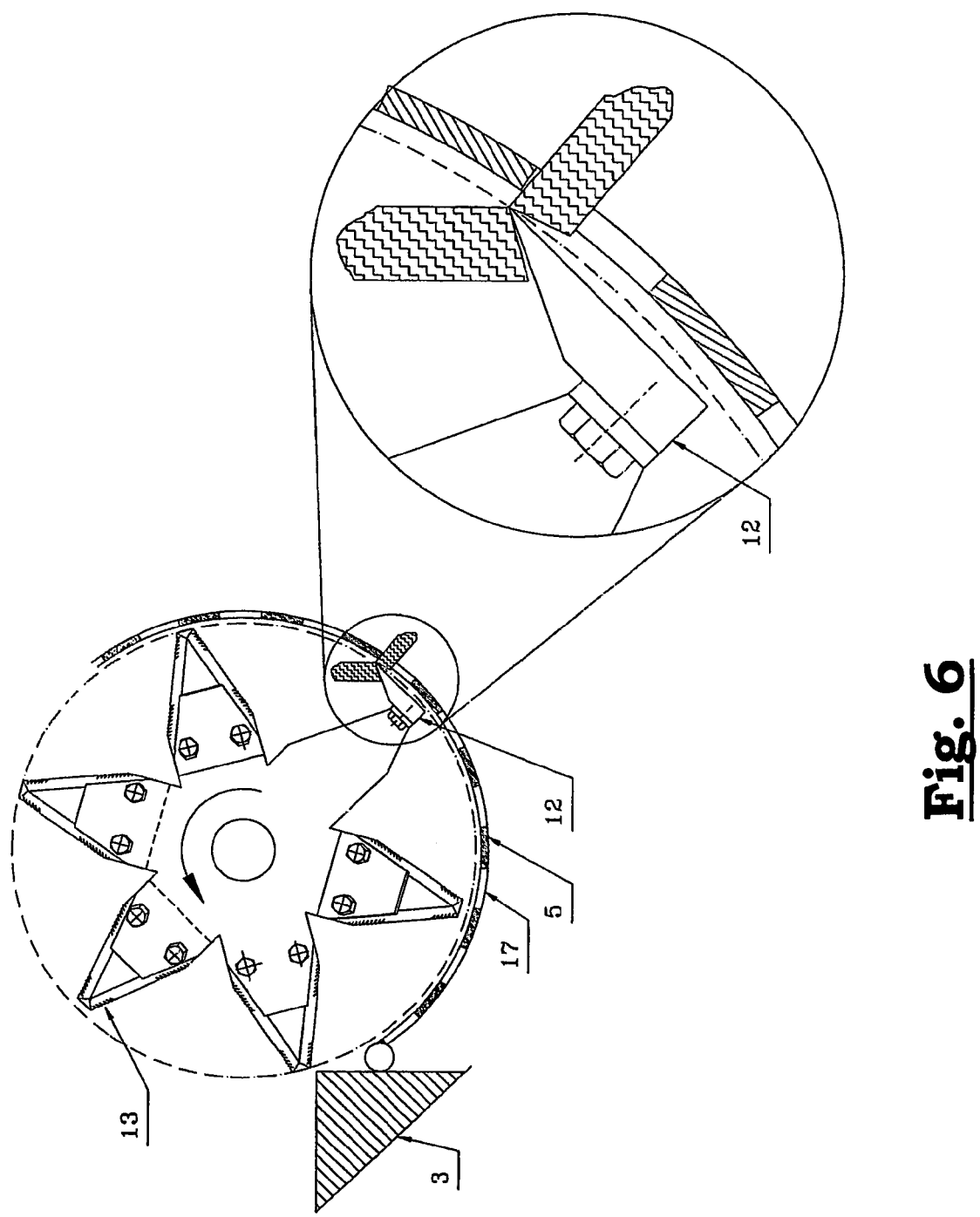
FIG. 6 shows the interaction between the chopping knife and the calibrating sieve and is displaying an example of the tertiary cutting.

Depending on the kind of material and the rate at which it is introduced, the initial cutting (primary cutting), occurring when the knives are active on the anvil (3), will produce shreds, the sizes of which are varying. Because it is desirable to obtain uniform and smaller shreds, part of the shreds need to be reduced in size before leaving the machine via the discharge. To that effect the invention provides a calibrating sieve (5). Under the influence of the calibrating sieve (5) the cutting device realizes a secondary and a tertiary cutting (see FIG. 6).

First of all, the calibrating sieve (5) will keep the big shreds, unable to pass the openings (17), within the shredding chamber (8). The large number of splitting knives (13) rotating in this chamber along different trajectories will further reduce the shreds (secondary cutting) until they will disappear through the openings (17).

Secondly, each opening (17) in the calibrating sieve (5) forms a mini-anvil for the various chopping knives (12) moving along this sieve surface narrowly missing it. In doing so, a great deal of the shreds, on moving through the opening (17), are chopped off once more by the chopping knives (12) (tertiary cutting—see FIG. 6).

These supplementary cuttings, created by the invention, will ensure that irrespective of the rate at which it is introduced and of the nature of the material, the cutting device will produce uniform and small shreds.

The invention claimed is:

1. Cutting device for reducing waste material, comprising at least two groups of knives situated on a shaft, next to one another, installed rotatably in front of an anvil, each of said groups of knives comprising several splitting knives, intended to split the waste material mainly according to the sense of supply and at least one chopping knife, intended to cut the waste material mainly across the sense of supply of the waste material to be cut, wherein each of the chopping knives of the groups of knives situated next to one another, operate in a zone of the width of supply and these chopping knives being mounted on the shaft and shifted with respect to one another, so that each of the chopping knives affects the waste material at a different time.

2. Cutting device according to claim 1, wherein the groups of knives are placed such, that projections of the cutting faces of the chopping knives will run into one another or at least will partly overlap one another.

3. Cutting device according to claim 1, wherein a number of said groups of knives are mounted next to one another in such a manner that the splitting and chopping knives will cover the total width of supply of the cutting device.

4. Cutting device according to claim 1, wherein said groups of knives in the cutting device are intended to uniformly reduce organic waste material.

5. Cutting device for reducing waste material, comprising at least two groups of knives situated on a shaft, next to one another, installed rotatably in front of an anvil, each of said groups of knives comprising several splitting knives to split the waste material mainly along a sense of supply and at least one chopping knife to cut the waste material mainly across the sense of supply of the waste material to be cut, wherein each of the chopping knives of the groups of knives situated next to one another operates in a zone of the width of supply and the chopping knives being mounted on the shaft and shifted angularly with respect to one another, so that each of the chopping knives affects the waste material at a different time, wherein the cutting device comprises a shredding chamber, the discharge side of which is provided with a sieve having openings for calibrating sizes of shreds.

6. Cutting device according to claim 5, wherein the sieve with passage openings, is provided for calibrating the shreds and generating a supplementary cutting of the waste material.

7. Cutting device for reducing waste material, comprising at least two groups of knives situated on a shaft, next to one another, installed rotatably in front of an anvil, each of said groups of knives comprising several splitting knives to split the waste material mainly along a sense of supply and at least one chopping knife to cut the waste material mainly across the sense of supply of the waste material to be cut, wherein each of the chopping knives of the groups of knives situated next to one another operates in a zone of the width of supply and the chopping knives being mounted on the shaft and shifted angularly with respect to one another, so that each of the chopping knives affects the waste material at a different time, wherein the splitting knives within one group of knives are mounted on the shaft, shifted with respect to one another, so that projections of their cutting faces do not coincide on the anvil.

8. Cutting device according to claim 7, wherein projections of a cutting face of each chopping knife determine a cutting zone, and in that the projections of the cutting faces of the several splitting knives in each of said groups of knives are distributed over the said cutting zone.

* * * * *